United States Patent [19]

Freeman

[11] Patent Number: 4,922,169

[45] Date of Patent: May 1, 1990

[54] METHOD AND APPARATUS FOR DRIVING A BRUSHLESS MOTOR

[75] Inventor: John J. Freeman, Longmont, Colo.

[73] Assignee: MiniScribe Corporation, Longmont, Colo.

[21] Appl. No.: 253,245

[22] Filed: Oct. 4, 1988

[51] Int. Cl.[5] .................... H02K 29/00; H02P 1/18
[52] U.S. Cl. ............................. 318/254; 318/138; 318/431
[58] Field of Search ............... 318/138, 254, 439, 430, 318/431

[56] References Cited

U.S. PATENT DOCUMENTS

| | | |
|---|---|---|
| 3,997,823 | 12/1976 | Machida . |
| 4,162,435 | 7/1979 | Wright . |
| 4,262,236 | 4/1981 | Gelenius et al. . |
| 4,262,237 | 4/1981 | Gelenius . |
| 4,390,826 | 6/1983 | Erdman et al. ............... 318/254 X |
| 4,429,262 | 1/1984 | Utenick . |
| 4,435,673 | 3/1984 | Hagino et al. . |
| 4,446,406 | 5/1984 | Uzuka . |
| 4,454,458 | 6/1984 | Holland ............................. 318/254 |
| 4,495,450 | 1/1985 | Tokizaki et al. ............... 318/254 X |
| 4,510,422 | 4/1985 | Ogura ................................. 318/254 |
| 4,603,283 | 7/1986 | Oltendorf ....................... 318/138 X |
| 4,641,066 | 2/1987 | Nagata et al. ..................... 318/254 |
| 4,651,067 | 3/1987 | Ito et al. . |
| 4,651,069 | 3/1987 | Pellegrini . |
| 4,658,308 | 4/1987 | Sander, Jr. . |
| 4,689,532 | 8/1987 | Howlett . |
| 4,712,050 | 12/1987 | Nagasawa et al. . |
| 4,743,815 | 5/1988 | Gee et al. ........................... 318/254 |

OTHER PUBLICATIONS

Ferraris et al., "P.M. Brushless Motor Drives: A Self-Commutating System Without Rotor-Position Sensors", 9th Symposium on IMCS&D, 1980, pp. 305-312.
Jufer et al., "Electrical Drive Control of an Artificial Heart", Swiss Federal Institute of Technology, pp. 65-70.

Primary Examiner—Bentsu Ro
Attorney, Agent, or Firm—Curtis, Morris & Safford

[57] ABSTRACT

An n-phase, m-pole (wherein n and m are integers) brushless motor is driven without use of physical rotary position detectors, such as Hall elements or the like. An harmonic component of back emf induced in the phases of the motor is detected and used to generate phase energizing signals (such as in response to zero crossings of the detected harmonic component) which, in turn, energize selected phases of the motor. Drive current is supplied to those phases which are energized by the phase energizing signal in predetermined sequence.

5 Claims, 5 Drawing Sheets

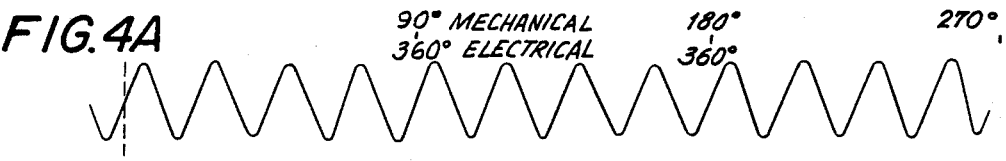
FIG.4A  90° MECHANICAL  180°  270°
360° ELECTRICAL  360°

FIG.4B  OUTPUT FROM COMP 1

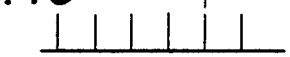
FIG.4C  OUTPUT FROM DOUBLE EDGE DETECTOR

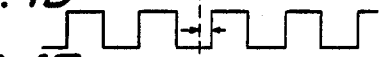
FIG.4D  OUTPUT FROM COMP 2

FIG.4E  B0 OUTPUT FROM D-TYPE FF

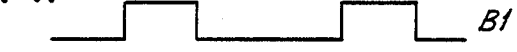
FIG.4F  B1

FIG.4G  B2

FIG.4H  $UHI = \overline{\overline{B1} \cdot \overline{B2}} = B1 + B2$

FIG.4I  $ULO = \overline{(B0 \cdot B1 \cdot \overline{B2}) + (\overline{B0} \cdot \overline{B1} \cdot B2)}$

FIG.4J  $VHI = \overline{B1}$

FIG.4K  $VLO = \overline{(B0 \cdot \overline{B1} \cdot B2) + (\overline{B0} \cdot B1 \cdot \overline{B2})}$

FIG.4L  $WHI = \overline{B2}$

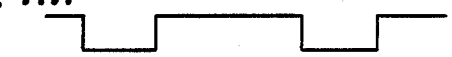
FIG.4M  $WLO = \overline{(B0 \cdot \overline{B1} \cdot \overline{B2}) + (\overline{B0} \cdot B1 \cdot \overline{B2})}$

FIG.4N  |U-V|U-W|V-W|V-U|W-U|W-V|U-V|U-W|V-W|V-U|W-U|  φ - ENERGIZATION

METHOD AND APPARATUS FOR DRIVING A BRUSHLESS MOTOR

BACKGROUND OF THE INVENTION

This invention relates to a method and apparatus for driving a brushless motor and, more particularly, to such a technique wherein an n-phase m-pole (wherein n and m are integers) brushless motor is driven without use of physical rotary position detectors, such as Hall elements, photosensors, or the like.

Brushless DC motors have found wide applications and general use in different industries. Typically, a rotor is formed of one or more pairs of magnetic pole pieces, such as permanent magnets, which rotate relative to a plural-phase stator. In many brushless DC motor constructions, the stator is comprised of three phases of stator windings, each phase being energized individually or in combination and in a predetermined sequence such that the magnetic forces induced between the stator windings and the magnetic rotor rotatably drive the rotor.

In one construction, drive current flows through each phase in only a single direction, thus giving rise to the designation "unipolar motor". In another arrangement drive current flows through a given phase in two different directions (at two different times), thus giving rise to the designation "bipolar motor". In both unipolar and bipolar motors, the phases are energized in sequence so as to produce a rotating magnetic force to drive the magnetic rotor.

Generated motor torque from phase to phase is generally sinusoidal, and optimal motor operation obtains if a respective phase is energized to generate a positive torque when the rotor rotates to a particular position relative to that phase. This particular position is a function of the mechanical construction of the stator.

Since the time at which a phase is energized is closely correlated to the angular position of the rotor, proper control over the brushless DC motor generally requires a sensing of the angular position of the rotor (sometimes referred to simply as "sensing the motor position"). Heretofore, rotor position has been sensed by the use of physical position detectors, such as Hall effect devices, optical sensors, and the like. Rotor constructions with integrated Hall elements are known, and these Hall elements generally are formed on the stator structure to sense the magnetic poles of the rotor as the rotor moves therepast. Thus, the Hall elements generate signals which represent the motor position. Usually, pulses are derived from the so-called Hall signals; and these Hall pulses are used to trigger drive signals which, in turn, energize the respective stator phases.

In a similar manner, optical sensors have been used to sense indicia mounted on or rotatable with the rotor, thereby sensing the rotary position of the motor. Sensor-generated signals, typically pulses, represent when the rotor has arrived at a predetermined location, whereupon the stator windings may be energized to create the proper rotary torque.

As motor driven devices have been reduced in size, the drive motors themselves have been miniaturized. Also, economic pressures have dictated lower costs for brushless DC motors. The combination of miniaturization and cost reduction has encouraged a solution to the problem of driving a brushless DC motor without relying upon physical rotary position detectors which add to motor size and cost.

It is known that, as a magnetic rotor rotates past stator windings, the rotor acts as a generator to induce signals in the windings, particularly those which are not then being energized. Currents flow through the windings in response to such induced back emf, and these currents together with the back emf appear as approximate sinusoidal waveforms. It has been proposed to use the back emf induced in a stator winding as a position signal analogous to the aforementioned Hall signal. See, for example, U.S. Pat. Nos. 3,997,823, 4,162,435, 4,262,236, 4,262,237, 4,446,406, 4,495,450, 4,651,069 and 4,712,050, as examples. However, the back emf induced in a winding is subject to electrical noise due, primarily, to so-called di/dt components in the windings. Furthermore, even if the back emf signal can be smoothed to provide generally a sinusoidal waveform, a limited number of position-representing signals (e.g., zero crossing pulses) can be derived from that back emf signal.

For example, in a 3-phase, 8-pole brushless DC motor, there are four electrical cycles in the back emf during one complete 360° rotation of the motor. If the zero crossing points of the back emf component are detected for the purpose of generating position-representing pulses, one complete rotation of the motor provides only eight so-called position pulses. If each such position pulse is used to synchronize the energization of the stator phases, thereby "stepping" the rotor at each energization, less than desired motor control is achieved because only eight position pulses are available for each motor revolution.

It is believed that a far more accurate representation of position be obtained if the third harmonic component provides six zero crossing pulses for each full cycle of the fundamental. Hence, the third harmonic component would provide 24 position pulses for each complete revolution of the motor. It is, of course, necessary to extract the third harmonic component from the stator windings in order to exploit it.

One suggestion for detecting the third harmonic is found in the paper entitled "Electrical Drive Control of An Artificial Heart", by Marcel Jufer et al. In this paper, it is suggested that the third harmonic can be detected by sensing the difference between the center tap point of the stator windings and the center tap point of a parallel-connected resistance network. Since the voltages at the respective center taps are substantially equal, except for the harmonic component, the difference obtained therebetween is, essentially, constituted by the third harmonic component. The Jufer et al. paper does not suggest how this third harmonic component, or the zero crossing pulses derived therefrom, should be used to control the energization of the stator windings.

Another difficulty associated with DC brushless motors having no physical position detectors relates to the start-up operation of such motors. In a DC brushless motor having position detectors, the actual starting position of that motor is known from the signals produced by the position detectors, namely the Hall elements, just prior to rotation. Since the sequence in which the stator windings are energized determines the initial direction of rotation of the motor, it is important that the proper sequence be selected initially to avoid, for some applications, reverse rotation; and the position pulses assure that the proper sequence is initiated. However, in the absence of such position pulses, it is difficult, if not impossible, to know the actual starting position of the rotor at start-up. This is particularly true when it is recognized that the rotor probably rotated to some arbitrary position during shut-down of a previous motor operation. Since the energization of the proper phase or phases is dependent upon the actual position of the rotor, but that position is not known, there is a likelihood that the motor may commence reverse operation when a particular (or arbitrary) phase is energized during start-up.

To avoid this possibility of reverse motor movement and to select the proper phase and sequence for a start-up operation in accordance with the actual rotor position, it has been proposed to measure the inductance of the stator phases prior to rotor movement. It was thought that the initial position of the rotor affects the inductance of the respective phases and, therefore, if such inductance can be measured, actual motor position will be known.

Such inductance measurement may be attained by sequentially energizing the stator phases in the same sequence as used during normal motor operation, and observing the current rise times through each phase. Unfortunately, the inductance of the respective phases of one motor may differ significantly from the inductances of the same phases of another. Moreover, within a quarter revolution of the rotor, there are two different rotor positions at which the inductance measurements are substantially identical. Hence, if inductance is used as an indication of motor position, it still would not be known if the motor is at one or the other of these positions providing equal inductance.

When a particular phase (or phases) of the stator is supplied with a drive current while the motor is at rest, it is statistically possible for the rotor to move backward fifty percent of the time. When considering a 3-phase, 8-pole brushless DC motor, depending upon the actual position of the rotor and the phases to which drive currents are supplied, the rotor may move backwards by as much as 3/24 revolutions. (A 3-phase, 8-pole motor may be considered a stepper motor having 24 individual steps for one complete revolution. Such a motor typically is driven by supplying drive currents to six different combinations of phase windings. Statistically, currents supplied to three of these combinations will result in a forward rotation of the motor and currents supplied to the remaining three combinations will result in a reverse rotation at start-up. One of the combinations of phase windings will result in a reverse movement of three steps, thus providing 3/24 revolutions.) In moving backwards, the motor will accelerate until it reaches what otherwise would be an equilibrium point, but because of momentum, the rotating motor will overshoot this point by almost as much as the rotor had moved to reach it. Thus, reverse rotation of the motor may be as much as 3/24+3/24 revolutions, or up to ¼ revolutions. For the environment in which the brushless DC motor is used as a spin motor for a rigid disk drive, a quarter revolution in the reverse direction may damage the disk drive heads.

OBJECTS OF THE INVENTION

Therefore, it is an object of the present invention to overcome the aforenoted disadvantages and difficulties associated with brushless DC motors wherein physical position detectors are omitted.

Another object of the invention is to provide an arrangement for driving a brushless motor without the use of physical rotary position detectors, such as Hall elements or the like.

A further object of this invention is to provide a technique for starting a brushless motor having no physical rotary position detectors, wherein reverse rotation of the motor is minimized.

An additional object of this invention is to provide a technique for driving an n-phase, m-pole brushless motor which utilizes the third harmonic component of back emf as an indication of the actual position of the rotor.

Yet another object of this invention is to provide a technique as aforementioned wherein the third harmonic component induced in the motor is used to control the generation of phase energizing signals which, in turn, determine which of the stator phases are to be energized, and the sequence of energization.

A still further object of this invention is to provide a unique technique for starting and accelerating a brushless motor toward its operating speed.

Various other objects, advantages, and features of the present invention will become readily apparent from the ensuing detailed description, and the novel features will be particularly pointed out in the appended claims.

SUMMARY OF THE INVENTION

In accordance with this invention, a technique is provided for driving an n-phase, m-pole (wherein n and m are integers) brushless motor without the use of physical rotary position detectors, such as Hall elements, optical sensors, or the like. An harmonic component of back emf induced in the phases of the motor is detected and used to derive phase energizing signals which, in turn, determine the particular phases of the motor which are to be energized, and the particular sequence of energization.

As one aspect of this invention, the harmonic component is detected by generating a simulated signal in response to the drive signals applied to those phases. The difference between this simulated signal and an actual composite signal derived from the motor (the composite signal having both an induced back emf component and a drive signal component) is obtained, thereby providing the harmonic component. In a preferred embodiment, this harmonic component constitutes the third harmonic of the back emf.

As another aspect of this invention, the crossing of a reference level, such as a zero level, by the harmonic component is sensed, and the occurrences of such reference level crossings are counted. The resultant count is decoded to generate phase energizing signals which, in turn, select the proper stator phases to be energized.

As a further aspect of this invention, the rotary speed of the brushless motor is controlled by comparing a signal derived from a "sense" current flowing through energized stator phases to a command signal representing a desired speed, and adjusting the drive current which flows through the energized phases so as to minimize any difference therebetween.

As yet another aspect of this invention, the m stator phases are connected in a star array; and, preferably, the motor includes three phases connected in a Y configuration with a parallel-connected Y resistor network, the latter generating the aforementioned simulated signal.

As another feature of this invention, a unique start-up technique is provided for initiating rotation of the aforementioned n-phase, m-pole brushless motor. The above-described phase energizing signals are generated in sequence at a relatively low frequency which is capable of rotating the motor at very low speeds, substantially less than the operating speed for which the motor is designed. The motor drive current is supplied to those phases which are energized by the phase energizing signals; and this motor drive current is increased from a reference (or zero) level to an operating level in a ramp-like manner. After the drive current has been increased to its operating level, the frequency of the phase energizing signals is increased so as to correspondingly drive the motor at faster speeds. After the motor speed has been increased to approximately half its desired operating speed, further acceleration and control of the motor is assumed by the position pulses generated from the harmonic component included in the induced back emf.

BRIEF DESCRIPTION OF THE DRAWINGS

The following detailed description, given by way of example, will best be understood in conjunction with the accompanying drawings, in which:

FIGS. 4A-4N are waveform diagrams which are useful in understanding the operation of the present invention.

DETAILED DESCRIPTION OF A PREFERRED EMBODIMENT

Figure 1:
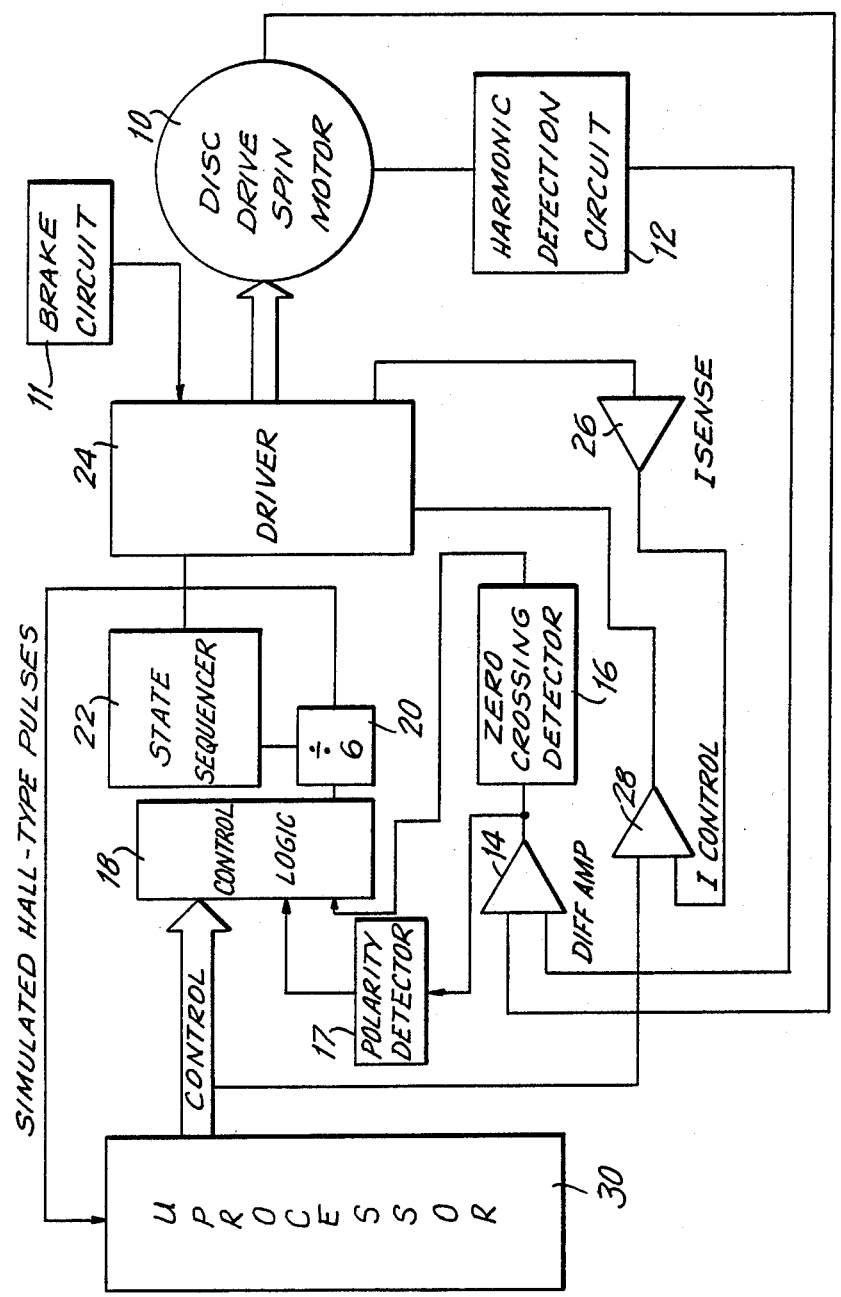
FIG. 1 a block diagram of a preferred embodiment of the present invention.

Referring now to the drawings, wherein like reference numerals are used throughout, FIG. 1 is a block diagram of one embodiment of motor drive circuitry capable of driving an n-phase, m-pole DC brushless motor 10. Although various applications for such a motor are known, for the purpose of the present description, it is assumed that motor 10 is used in a computer disk drive device and, more particularly, as the spin motor for rapidly rotating the rigid disks in what has been called a Winchester disk drive. It will be appreciated, however, that the present invention need not be limited solely for use with such a rigid disk drive device.

No physical rotary position detectors, such as Hall elements, optical sensors, or the like, are used with motor 10. Hence, the motor sometimes is referred to herein as a Hall-less brushless motor. As is known, in a conventional Hall-type (or equivalent) brushless motor, the Hall elements (or optical sensors, or the like) generate signals, typically pulse signals, representative of the particular angular position of the rotor. These signals, also known as Hall pulses, are used to control when a respective phase (or phases) of the motor is supplied with a drive current, thereby driving the motor at a predetermined, desired speed.

In many motor designs, these Hall elements are located at 30°, 60°, and 90° locations so as to produce pulses as the rotor rotates by 30°, 60°, and 90°, respectively. In other motor designs, the Hall elements are spaced apart by 60°, and in still other designs the Hall elements are spaced apart by 120°. The number of Hall elements which are used is a function of the number of stator phases; and in a typical 3-phase brushless DC motor, only three Hall elements need be provided to generate suitable Hall pulses for determining when the respective phases are to be supplied with current.

Since the rotor of the typical brushless motor is formed of one or more pairs of magnetic poles, the rotation of those magnetic poles induces a back emf in each of the stator phases. While this back emf tends to counter the drive current supplied to an energized, or active, phase, the back emf may best be observed in an inactive phase.

It will be seen that, for optimum operation of the motor, the Hall pulses should coincide with the zero crossing points of the back emf. However, based upon the actual placement of the Hall elements on the motor, the Hall pulses may lead or lag these zero crossing points. Assuming Hall element placement such that the Hall pulses coincide with the zero crossings of the back emf, any difference between the occurrence of the Hall pulses and the zero crossings is known as the "lead angle", and the optimum lead angle in a properly designed motor is 0°. Since the back emf normally is 180° out of phase with the drive voltage supplied to each phase, the optimum lead angle with respect to the drive voltage also is 0°.

In the present invention, motor 10 is a Hall-less brushless motor and, therefore, the aforementioned Hall pulses are not generated. However, it has been found that the third harmonic of the induced back emf exhibits zero (or, more broadly, reference level) crossings which, if detected, provide a good representation of the angular position of the rotor. The circuitry illustrated in FIG. 1 detects this harmonic component, senses the zero (or reference level) crossings thereof, and generates phase energizing signals in response to those detected crossings for the purpose of supplying drive currents to the respective phases in response to those signals.

In the preferred embodiment, which has been tested, motor 10 is a 3-phase, 8-pole motor (i.e., n=3 and m=8), with the phase windings being connected in a star array which, for a 3-phase motor, constitutes a Y configuration. The center tap or neutral point of the phase windings is used to provide the third harmonic of the induced back emf.

Although a 3-phase Y connected, 8-pole motor has been tested and is preferred, it will be appreciated that n and m may be other integers. Furthermore, other configurations of the phase windings may be used, provided that the third harmonic component of the induced back emf may be detected or otherwise derived.

The drive circuitry used in accordance with the present invention comprises an harmonic detection circuit 12, a difference amplifier 14, a zero (or reference level) crossing detector 16, a polarity detector 17, a frequency divider or counter 20, a state sequencer circuit 22 and a drive current generator 24, the latter being described (for convenience) as a driver. Harmonic detection circuit 12 is comprised of a network having an array of elements similar to the winding array of motor 10 and connected in parallel thereto. Thus, for the preferred embodiment wherein the motor windings are connected in a Y configuration with a neutral point that may be accessed (the neutral point thus being referred to as a center tap), harmonic detection circuit 12 is formed as a Y configuration of circuit elements having a similar center tap. It is preferred that the harmonic detection circuit be formed of relatively basic circuit elements and, in this regard, the circuit is formed as a Y-configuration of resistors, each resistor being connected in parallel with a respective phase winding of motor 10. The center tap of harmonic detection circuit 12 is coupled to one input of difference amplifier 14 and the center tap of the motor windings is connected to another input of this difference amplifier. Thus, the difference amplifier serves to obtain a difference between the signals appearing at the center tap of the motor winding and at the center tap of the resistor network. It will be appreciated that the signal produced at the center tap of the motor winding is a composite signal having a phase energizing signal component, that is, a component attributed to the energizing voltage applied to the motor, and an induced back emf component. The signal provided at the center tap of the parallel-connected resistor network may be thought of as a simulated signal produced as a result of the parallel connection between the resistors and the stator phases. The simulated signal, however, does not include a third harmonic component. Thus, by obtaining the difference between the composite signal provided at the center tab of the motor windings and the simulated signal provided at the center tab of the resistor network, essentially only the third harmonic component of the induced back emf is produced. In addition, noise signals attributed to the current flow through the motor windings and those noise components referred to as di/dt components may be minimized by suitable filtering. As one example, a low pass filter may be used having a so-called corner frequency slightly greater than the frequency of the third harmonic of the back emf when motor 10 rotates at its designed speed (e.g., 3600 RPM). This filtering reduces noise, and particularly the di/dt component, without introducing significant phase shift.

Zero crossing detector 16 is coupled to difference amplifier 14 and is adapted to sense the zero crossing points of the third harmonic component. As will be described, pulses produced by the zero crossing detector are counted by counter 20; and this count is sensed by state sequencer circuit 22.

A polarity detector 17 also is coupled to difference amplifier 14 and is adapted to detect when the third harmonic component is positive or negative relative to a zero reference level. Additionally, the polarity detector provides a substantial measure of noise immunity to transient signals (e. g. noise spikes) that may be present in the third harmonic component and could otherwise falsely trigger counter 20.

Counter 20 is constructed as a frequency divider circuit and is coupled to zero crossing detector 16 and to polarity detector 17 via control logic 18. Control logic 18 is coupled to a microprocessor 30 and as will be described below with respect to the schematic diagram of FIG. 2, supplies to frequency divider 20 either the pulses derived from the third harmonic component of the induced back emf, as during normal motor operation, or clock pulses provided by the microprocessor, as during a start-up operation.

Frequency divider 20 divides the frequency of the pulses supplied thereto by control logic 18 by a factor that is a function of the construction of motor 10. For example, for the embodiment wherein motor 10 is formed with 3 phases and 8 poles, the motor may be thought of as a 24-step stepper motor. That is, the motor will make one complete revolution in response to 24 separate stepper pulses. Since 8 poles are provided, one complete 360° revolution of the motor, that is, one mechanical cycle, encompasses 4 electrical cycles. Therefore, one electrical cycle is sufficient to rotate the motor by ¼ revolution, or 6 steps. Six individual unique energizing states thus are needed to advance the motor by these 6 steps. Consequently, the dividing factor of frequency divider 20 is equal to 6.

Frequency divider 20 also may be thought of as a count-to-6 counter, whose count is advanced in response to each pulse supplied thereto by control logic 18. State sequencer circuit 22 is coupled to counter 20 and is used to decode the instantaneous count thereof to generate phase energizing signals. These phase energizing signals are adapted to select the particular phases of motor 10 which are to be energized.

In the embodiment described herein, the motor is a bipolar motor which means that current flows through a particular phase in one direction for one decoded count of counter 20, that is, for one state of state sequencer circuit 22, and current flows through that same phase in the opposite direction for a different state of the state sequencer circuit. Furthermore, for each state of the state sequencer circuit, two of the motor phases are energized, thereby providing six different combinations of phases which may be energized for each electrical cycle. That is, six different combinations of two phases each are energized to rotate the motor by a quarter revolution.

Driver 24 is coupled to state sequencer circuit 22 and is adapted to supply drive current to those phases which are selected for energization by the state sequencer circuit. One embodiment of a driver is described in conjunction with the schematic diagram of FIG. 2. In simplified form, the driver may be thought of as sets of transistor switches, with one set of transistor switches simply being turned ON and OFF to connect a stator phase to a source of energizing potential, thereby supplying a drive current thereto. The other set of transistor switches may be thought of as variable resistors whose resistance is a function not only of whether that transistor is turned ON, but also as a function of a bias current that may be supplied thereto. As an example, these latter transistor switches may be FET devices, such as IRFD123 devices. The conductivity of such devices, and thus, the magnitude of the current flowing therethrough, is a function, at least in part, of the bias current applied to the base (or gate) electrode.

Driver 24 also is coupled to a current sense amplifier 26 and a current comparator 28. The current sense amplifier includes a calibrated resistor connected to driver 24 and adapted to have a drive current flow therethrough whenever drive current is supplied to the stator phases. For example, this calibrated resistor, also known as a current sense resistor, may be connected in common to all of the aforementioned variable resistor-type transistor switches. Hence, if current flows through any one of these switches, it also flows through the current sense resistor. As a result, a voltage is produced across this current sense resistor which is a measure of the current flowing through the energized stator windings. Current sense amplifier 26 is adapted to produce a signal representing this voltage, and thereby provide a measure of actual motor current.

Comparator 28 is coupled to current sense amplifier 26 and also to microprocessor 30 and is adapted to determine when the actual motor current differs from a desired current. A command signal representing desired motor current is supplied to comparator 28 by microprocessor 30. If motor speed is to be increased, as when the actual speed falls below a desired speed, the command signal represents an increase in motor current. Conversely, if motor speed is to be reduced, the command signal calls for a decrease in motor current. Thus, comparator 28 functions to compare the command signal to the motor current signal to produce an error signal representing the difference between actual and desired motor current. This error signal is used to vary the bias current supplied to the variable resistor transistor switches included in driver 24, thereby varying the conductivity of those transistor switches and, thus, the magnitude of the current flowing through the energized stator phases. Consequently, motor speed is increased or decreased.

Actual motor speed is represented by pulses supplied from counter 20 to microprocessor 30. These pulses are derived from the zero crossing detector pulses; and as actual motor speed increases, the frequency of the speed-representing pulses produced by counter 20 increases. It is appreciated that the period separating such pulses is a measure of motor speed; and this period is sensed by the microprocessor. If microprocessor 30 senses that the actual motor speed differs from a desired level, the command signal supplied thereby to current comparator 28 increases or decreases, accordingly, to control motor current and, thus, motor speed.

FIG. 1 also illustrates a brake circuit 11 coupled to driver 24. The brake circuit may be of the type described in U.S. Pat. No. 4,658,308, assigned to MiniScribe Corporation, the assignee of the present invention, and functions as a dynamic brake to arrest the rotation of motor 10 upon the interruption of power to the illustrated circuitry. Further description of the brake circuit is not provided herein.

The operation of the motor control circuit illustrated in FIG. 1 now will be briefly described. A more detailed discussion of this circuit is set out hereinbelow in conjunction with the schematic diagram of FIG. 2 and the waveform diagrams of FIG. 4. Let it be assumed that motor 10 is operating at or close to its designed speed of, for example, 3600 RPM. As the rotor rotates, a back emf is induced in the stator windings. This back emf includes a third harmonic component and also a component attributed to the drive currents supplied to those phase windings which are selected for energization by driver 24. Likewise, harmonic detection circuit 12 generates a simulated signal in response to the phase energizing signals which are applied to the Y-connected resistors which are in parallel with the Y-connected stator windings. The simulated signal provided at the center tap of the harmonic detection circuit and the composite signal provided at the center tap of the stator windings are supplied to difference amplifier 14 which generates a difference signal that is a measure of the difference between the simulated and composite signals. The only significant difference between the simulated and composite signals is the third harmonic component, and difference amplifier 14 derives this third harmonic component. As mentioned above, noise, such as the di/dt component, may be filtered by connecting a suitable low pass filter to the difference amplifier.

The zero crossings of the derived third harmonic component are detected by zero crossing detector 16 and supplied to counter 20 by control logic 18. Since there are six zero crossing pulses derived from the third harmonic component for each cycle of the fundamental of the back emf induced in the stator windings, counter 20 provides six unique counts at 60° (electrical) intervals during one cycle of the fundamental; and state sequencer circuit 22 decodes each count to select a pair of stator phases to be energized. For example, if the stator phases are designated as phases U, V, and W, then state sequencer circuit 22 selects the following pairs of phases to be energized in the following sequence: U-V, U-W, V-W, V-U, W-U, and W-V. As each pair of windings is selected for energization, driver 24 supplies a drive current therethrough. Thus, each phase is energized at the correct time that a rotor pole rotates to a proper position relative to that phase. Hence, a proper torque is generated to overcome stiction, friction, load and other drag that might be applied to the motor.

Let it be assumed that microprocessor 30 supplies a current command signal to comparator 28 representative of a desired motor speed such as 3600 RPM. The current which flows through the energized phases establishes the motor speed, and current sense amplifier 26 supplies to comparator 28 a signal derived from the sensed drive current. As mentioned above, this current sense signal is a measure of actual motor current. Comparator 28 produces an error signal if the actual motor current differs from the desired current (the latter being produced in response to sensed motor speed which, as mentioned above, is detected from the pulses supplied by counter 20). This error signal is applied as a bias signal to the variable resistor-type transistor switches so as to correspondingly adjust the drive current level and, thus, compensate for motor speed fluctuations. For example, if sensed motor speed falls below 3600 RPM, the current command signal is increased, resulting in an increase in the drive current to accelerate the motor to 3600 RPM. Alternatively, if the sensed motor speed exceeds 3600 RPM, the current command signal is reduced, or may exhibit a zero value, thereby reducing the bias current so as to reduce the magnitude of the drive current supplied to the motor. As a result, the motor is decelerated to 3600 RPM.

A start-up operation of motor 10 now will be described.

An n-phase, m-pole brushless DC motor functions as a stepper motor. As mentioned above, the 3-phase, 8-pole motor described herein undergoes 24 separate steps to motor is rotating, there is, of course, no back emr and, thus, no representation of angular position when the motor is at rest. Hence, the rotor may assume the position associated with any one of the 24 steps required for a complete revolution; and since there are 4 electrical cycles included in one mechanical cycle (i.e., included in one complete revolution), it is seen that the actual position of the rotor may correspond to any one of the six states produced by state sequencer circuit 22. It will be seen, however, that only one of these six states is the proper state to energize the correct stator phases so as to rotate the motor in the forward direction. Of the five remaining states, three may result in reverse rotation of the motor, and one of these three may produce maximum torque so as to generate maximum reverse acceleration. Therefore, since the actual at-rest position of the motor is not known, the initial phase energization state that may be present in state sequencer circuit 22 may drive the rotor backward by a maximum of three steps, or ⅛ revolution. Furthermore, if this particular state results in maximum reverse acceleration of the motor, the motor may overshoot its reverse target position (i.e., the equilibrium position to which the motor is driven as a result of the phase energization state) by slightly less than 3 steps. At that time, the rotor would stop and then accelerate in the forward direction toward its aforementioned target position. Hence, the motor may rotate in the reverse direction by a maximum of almost 6 steps, or ¼ revolution. Furthermore, by reason of the aforementioned overshoot, the rotor tends to oscillate about the target position for several cycles until friction stops the motor at its target position.

The foregoing describes the possible oscillatory movement of the motor when an arbitrary phase energization state is selected, but the state sequencer circuit 22 is not advanced. Thus, depending upon the selected state, the motor may oscillate about a target position for a few cycles until equilibrium is attained. The motor then remains at this target position until another phase energization state is selected. If, during this start-up operation, the phase energization state changes at a fast rate, that is, if state sequencer circuit 22 is sequenced rapidly, the torque which is generated by energizing sequential phases will not be sufficient to overcome the inertia, stiction, friction, and load of motor 10. Hence, the motor will not start. Conversely, if the state sequencer circuit is sequenced too slowly, the motor merely steps to different target positions and oscillates thereat until equilibrium is attained at each such position. Consequently, it is desired to step the state sequencer circuit from one state to the next at a rate which is substantially synchronized with the rate at which the motor advances to, and attains equilibrium at, a target position. That is, just as the motor is about to reach equilibrium, the phase energization state should change so as to advance the motor by one more step.

The phase energization state should be sequenced at a rate that is a function of the inertia of the motor and load and the friction of the motor as well as load friction. If inertia increases, the sequencing rate should be reduced to start the motor. In one example wherein the present invention is used in a disk drive, it has been found that the start-up sequencing rate should be on the order of about 25 Hz to start the rotation of a motor having 1.4 g-cm. of available torque, $6 \times 10^{-5}$ kg$-$m$^2$ of rotary inertia and 8Nm friction. Of course, for other applications with different inertia and friction of motor and load, the sequencing rate will be greater or less than this numerical example.

To effect a start-up operation, microprocessor 30 applies a suitable control signal to control logic 18, whereby any signals which may be applied to the control logic from zero crossing detector 16 are inhibited from being supplied to counter 20. Instead, the microprocessor supplies a clock signal of a frequency sufficient to advance state sequencer circuit 22 at a rate which generates a torque capable of initiating motor rotation with minimal oscillations. This torque is a function of the torque constant K of the motor, the inertia of the load, motor friction and load friction. Control logic 18 supplies this clock signal to counter 20 whereat the clock signal is counted; and the instantaneous count thereof is decoded by state sequencer circuit 22 to generate successive phase energization states. As during normal operation of motor 10, these phase energization states select the respective stator phases to be energized, and driver 24 supplies drive currents to the selected phases.

The stator phases are sequentially selected for energization by the state sequencer circuit at a rate which generates sufficient torque to overcome the torque constant $K_T$, load inertia and friction, yet minimizes oscillations. However, the drive current supplied to the stator windings initially is at a relatively low reference level, such as zero. Hence, initially, drive current is not supplied to the motor even though phase selection is sequenced. Driver 24 is controlled by, for example, comparator 28, to increase the drive current magnitude gradually over time, such as in a ramp-like manner to an operating level, sometimes referred to as the motor drive level. In the example described above, the current was increased to a motor drive level on the order of about 700 ma. It is appreciated that this increase in the drive current may be brought about by increasing the command signal supplied to comparator 28 by microprocessor 30. In one practical embodiment, the drive current is "ramped up" over a 2 second interval.

The drive current magnitude increases as the rotor phases are selected for energization at a rate which generates sufficient torque to overcome the load and motor inertia and the load and motor friction; and rotate the motor with no or little oscillation. The torque generated thus increases gradually as the drive current is ramped up. It has been observed that this torque initially is not of sufficient magnitude to rotate the motor continuously. It is adequate, however, to overcome motor stiction, and as a result, the motor is observed to quiver during the initial stages of the start-up operation. Until the phase energization state produced by state sequencer circuit 22 matches the at-rest position of the motor, the motor may quiver or oscillate, by about ±5° before rotation commences. At approximately one-half second after initiating the start-up operation, motor 10 pulls in at a relatively low speed. For the example described above, this pull-in speed was measured at approximately one revolution per second. This delay is attributed primarily to load stiction and to the friction of the motor bearings. Once rotation begins, the lag angle, that is, the angle between the drive current (which coincides with torque) and rotor position is relatively large. As the motor accelerates from its at-rest position to pull in, torque increases as the drive current amplitude increases. When the drive current reaches the motor drive level, the lag angle decreases until the actual position of the rotor leads the torque. At that time, the instantaneous torque applied to the motor is less than that needed to maintain the motor speed and consequently, the motor slows down. The lag angle then increases to correspondingly increase the torque. This fluctuation in the lag angle results in a modulation of the motor velocity. However, because of motor friction and load, such velocity modulations damp. Motor speed is substantially stabilized at a time $t_1$ following initiation of the start-up operation, and at that time microprocessor 30 gradually increases the frequency of the clock signal supplied to counter 20, thereby increasing the sequence at which the phase energizing signals are produced by state sequencer circuit 22. In one embodiment, it has been found that satisfactory start-up operation is achieved if $t_1$ equals 2 seconds.

As the repetition rate of the clock signal supplied to counter 20 by microprocessor 30 increases, the rate at which the phases of motor 10 are sequentially energized likewise increases to accelerate the motor. When the motor speed reaches approximately half the designed operating speed, microprocessor 30 commands control logic 18 to supply the zero crossing pulses produced by zero crossing detector 16 to counter 20. As a numerical example, if motor 10 is designed to operate at about 3600 RPM, the pulses supplied to counter 20 are changed over from the clock signals produced by the microprocessor to the zero crossing pulses derived from the detected harmonic component of the induced back emf when the motor speed reaches about 1800 RPM. Thereafter, the generation of the phase energizing signals by state sequencer circuit 22 is from the zero crossing pulses as counted by counter 20, thereby commutating the motor at the proper time allowing it to accelerate toward its maximum operating speed.

The changeover from microprocessor-driven control over state sequencer circuit 22 to zero crossing control is achieved as a function of a table of acceleration versus motor speed stored in the memory of microprocessor 30. This table represents time values between "step" pulses to be issued to counter 20 and is based on the available dynamic torque at various speeds, motor and load inertias, motor and load friction and desired torque utilization for the motor and load. Step pulses having the aforementioned time values accelerate the motor. When the last stored value is used, the microprocessor then switches motor control to the zero crossing detector.

A graphical representation of the start-up operation described above is illustrated in FIG. 5. It is seen that, during the initial portion of the start-up operation, motor 10 quivers and then rotates slowly while undergoing velocity modulation. At this time, for a motor having 1.4 g-cm of available torque, $6 \times 10^{-5}$ kg$-m^2$ of rotary inertia and 8 Nm of friction, the phase energizing signals are generated at a 25 Hz rate, while the motor drive current is ramped up to approximately 700 MA. At time $t_1$, for example, after about 2 seconds, velocity modulations are substantially damped and the frequency of the phase energizing signals increases from time $t_1$ to time $t_2$. This increase in frequency is from about 25 Hz to approximately 750 Hz. At time $t_2$, which may be at approximately 6 seconds, motor 10 will have accelerated to about 1800 RPM. At that time, microprocessor 30 commands control logic 18 to supply the zero crossing pulses produced by zero crossing detector 16 to counter 20. It is apparent that the clock signals generated by the microprocessor no longer are supplied to the counter. Motor 10 then accelerates quickly to its designed operating speed of 3600 RPM. In one example, this operating speed is achieved approximately 6.4 seconds after the initiation of the start-up operation.

With the start-up operation carried out in the manner discussed above, motor 10 undergoes minimal reverse rotation, limited only to the aforementioned quiver of approximately 5±. If the motor is used in the environment of a rigid disk drive, it is desirable to minimize reverse rotation and thereby avoid damage to the disk media by the read/write heads which, typically, are designed to withstand disk contact if the disks are rotated in the forward direction. Significant reverse movement of the disks may, however, result in media damage.

During the start-up operation described above, first the state sequencer is clocked at a constant rate while the drive current is "ramped up" to its operating level and then, after a delay sufficient to damp velocity modulation, the frequency of the phase energizing signals is ramped up. An adequate delay has been found to be on the order of about one second, although other delays may be employed.

Since the damping of velocity modulation is dependent on motor friction and load, these modulations damp at a quicker rate if the motor bearing friction and/or load friction is greater. Hence, depending upon the intended application of the motor, a greater or lesser delay may be provided between the time that the drive current is "ramped up" and the time that the phase energizing frequency is "ramped up". It is appreciated that, preferably, microprocessor control over the start-up operation terminates at time $t_2$. For the motor having the torque, inertia and friction mentioned above, the phase energizing frequence was ramped up from an initial rate of 25 Hz at time $t_1$, to a rate of 750 Hz at time $t_2$.

Figure 2:
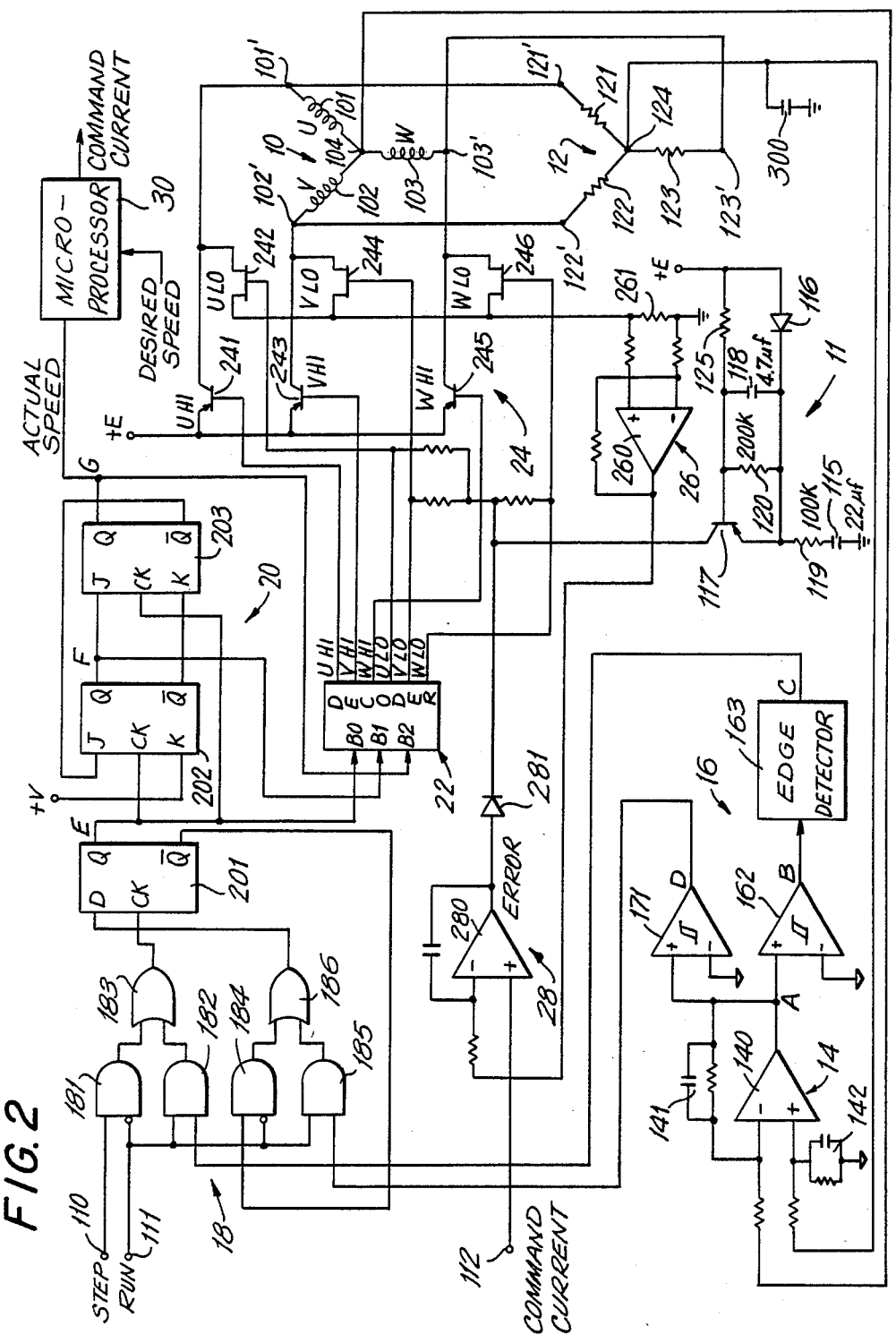
FIG. 2 a schematic diagram of the motor drive circuitry in accordance with the present invention.

A schematic diagram of the motor control circuitry shown in FIG. 1 is illustrated in FIG. 2 and now will be described. Motor 10 is illustrated as a 3-phase Y-connected stator having phases 101, 102 and 103, identified as phases U, V and W, respectively. A common connection 104 of these 3 phases constitutes the center tap of the stator windings. Harmonic detection circuit 12 is connected in parallel with these stator windings and is illustrated as comprising Y-connected resistors 121, 122 and 123, respectively. These resistors are joined at a common connection 124, which comprises the center tap of the resistor network.

Difference amplifier 14 is comprised of an operational amplifier 140 having an inverting input coupled to center tap 104 and a non-inverting input coupled to center tap 124. A 2 pole low pass filter 141 and 142 is incorporated as part of the difference amplifier and serves to filter the signal derived from the difference between center tap 104 and center tap 124. This differential low pass filtering removes noise due to the switching of current through phases U-W and also passes substantially only the third harmonic component of the back emf.

It is recalled that difference amplifier 14 produces a difference signal as a function of the difference between the inputs supplied from center taps 104 and 124, respectively, this difference signal comprising the third harmonic component of the back emf induced in the stator windings. As mentioned above, a simulated signal is provided at center tap 124 in response to the phase energizing drive currents which are supplied to resistors 21, 122 and 123 connected in parallel with phases U, V and W, respectively. The composite signal produced at center tap 104 includes a component generated in response to the phase energizing currents supplied to the stator phases and also the harmonic components of the back emf. The difference between the simulated and composite signals, as produced by operational amplifier 140, thus is seen to be substantially equal to the third harmonic components. In most motors, and preferably herein, the third harmonic is the most prevalent of these harmonic components.

It has been found that, since the simulated signal is produced by a resistor network, the rise times of the simulated signal are faster than the rise times of the composite signal provided at center tap 104. Low pass filter 300, shown as a simple capacitor, tends to delay the signal provided from center tap 124 so as to bring its rise time more in line with that provided from center tap 104. Hence, differences which might otherwise appear at the output of operational amplifier 140 because of these different rise times are minimized.

Zero crossing detector 16 is comprised of a comparator 162 and an edge detector 163. The comparator is coupled to operational amplifier 140 and is adapted to compare the third harmonic component supplied by the operational amplifier to a reference level. When the third harmonic component exceeds the reference level, a positive output is produced by the comparator. Conversely, when the third harmonic component falls below this reference level, a relatively negative output is produced. A reference level on the order of about 6 volts is supplied to comparator 162 (this is because the DC voltage at center tap 104 and at center tap 124 is approximately 6 volts).

Polarity detector 17 is comprised of comparator 171 coupled to operational amplifier 140 and is adapted to compare the third harmonic component to a reference level which, for example, also may be on the order of 6 volts.

Both comparator 162 and comparator 171 have some hysteresis. Comparator 162 has approximately a 0.1 volt hysteresis and comparator 171 has approximately a 2 volts hysteresis. The hysteresis exhibited by comparator 162 provides some noise immunity and the hysteresis exhibited by comparator 171 produces a rectangular waveform which exhibits a phase delayed relationship with respect to the third harmonic component. As a result, a large degree of noise immunity is provided.

The reference level supplied to comparator 162 establishes the location of the zero crossing pulses relative to the third harmonic component.

Edge detector 163 is coupled to comparator 162 and is adapted to detect the positive-going and negative-going transitions of the rectangular waveform produced by the comparator. A pulse, preferably a positive-going pulse, is produced in response to each detected edge. As an example, a small delay, on the order of nanoseconds, may be imparted to the output of comparator 162, and edge detector 163 may comprise an exclusive OR circuit having one input connected to receive the delayed rectangular waveform and another connected to receive the undelayed rectangular waveform. The output of this exclusive OR circuit is comprised of pulses which coincide with the edges of the rectangular waveform.

Control logic 18 is comprised of AND gates 181, 182, 184 and 185, and OR gates 183 and 186. Inputs 110 and 111 are coupled to AND gate 181 and are adapted to receive control signals from microprocessor 30 (not shown in FIG. 2). Input 110 receives clock signals generated by the microprocessor, as discussed above, and input 111 receives a control signal which, for example, comprises a binary "0" during start-up operation and a binary "1" during normal motor operation. This control signal is referred to herein as a "run" control signal.

AND gate 181 includes an inverting input coupled to input 111 such that this AND gate is inhibited during normal motor operation and is enabled during start-up operation. AND gate 182 includes an input coupled to input 111 and is enabled during normal motor operation and is inhibited during a start-up operation. The other input of AND gate 182 is coupled to edge detector 163 to receive the zero crossing pulses derived from the third harmonic component. The outputs of AND gates 181 and 182 are coupled by OR gate 183 to a clock input of a D-type flip-flop circuit 201.

AND gate 184 includes an inverting input coupled to input 111 so as to be enabled during a start-up operation and disabled during a normal motor operation. The other input of AND gate 184 is connected to the $\overline{Q0}$ output of flip-flop 201. AND gate 185 includes one input coupled to input 111 to be enabled during a normal motor operation and disabled during a start-up operation. The other input of AND gate 185 is coupled to comparator 171 to receive the rectangular waveform produced by this comparator in response to the third harmonic component. The outputs of AND gates 184 and 185 are coupled by OR gate 186 to the D input of flip-flop circuit 201.

It will be apparent from the discussion below that control logic 18 supplies to the clock input of flip-flop circuit 201 either the clock pulses generated by the microprocessor during a start-up operation or the zero crossing pulses generated by edge detector 163 during a normal motor operation. Additionally, the control logic controls the state of the logic signal supplied to the D input of this flip-flop.

Counter 20 is comprised of D-type flip-flop circuit 201 and J-K flip-flop circuits 202 and 203. The Q output of flip-flop 201 is coupled to the clock inputs of flip-flops 202 and 203 such that a negative transition serves to "clock" each J-K flip-flop to assume the state determined by the data supplied to the J and K inputs thereof. As is known to those of ordinary skill in the art, if a binary "1" is supplied concurrently to both the J and K inputs, the state of the J-K flip-flop will be changed over. As illustrated, the Q and $\overline{Q}$ outputs of flip-flop 202 are coupled to the J and K inputs, respectively, of flip-flop 203. The Q output of flip-flop 203 is coupled to the J input of flip-flop 202, and the K input of flip-flop 202 is supplied with a binary "1" by connecting it to a suitable voltage source +V. The Q output of flip-flop 203 is coupled to microprocessor 30 to supply a signal thereto representative of the actual speed of motor 10. This signal simulates the Hall pulses normally produced by a Hall detector circuit and is used by the microprocessor to determine the difference between actual and desired motor speeds and to produce in response thereto a signal commanding an increase or a decrease in motor current as may be necessary to make the motor speed equal to the desired speed.

State sequencer circuit 22 is illustrated as a decoder coupled to the Q outputs of flip-flops 201, 202 and 203, respectively. The signals produced by these respective Q outputs are identified as signals B0, B1 and B2. The decoder produces phase energizing signals which are used to select pairs of phases U, V and W through which drive currents flow.

For convenience, decoder 22 is provided with six outputs, two of which are active at any given time, thereby producing six separate phase states. The outputs of decoder 22 are identified as Uhi, Vhi and Whi, and also as Ulo, Vlo and Wlo. An active decoder output is represented by a binary "0", and a respective phase state appears as a binary "0" at one of the Uhi, Vhi and Whi outputs as well as a binary "0" at one of the Ulo, Vlo and Wlo outputs.

Figure 3:
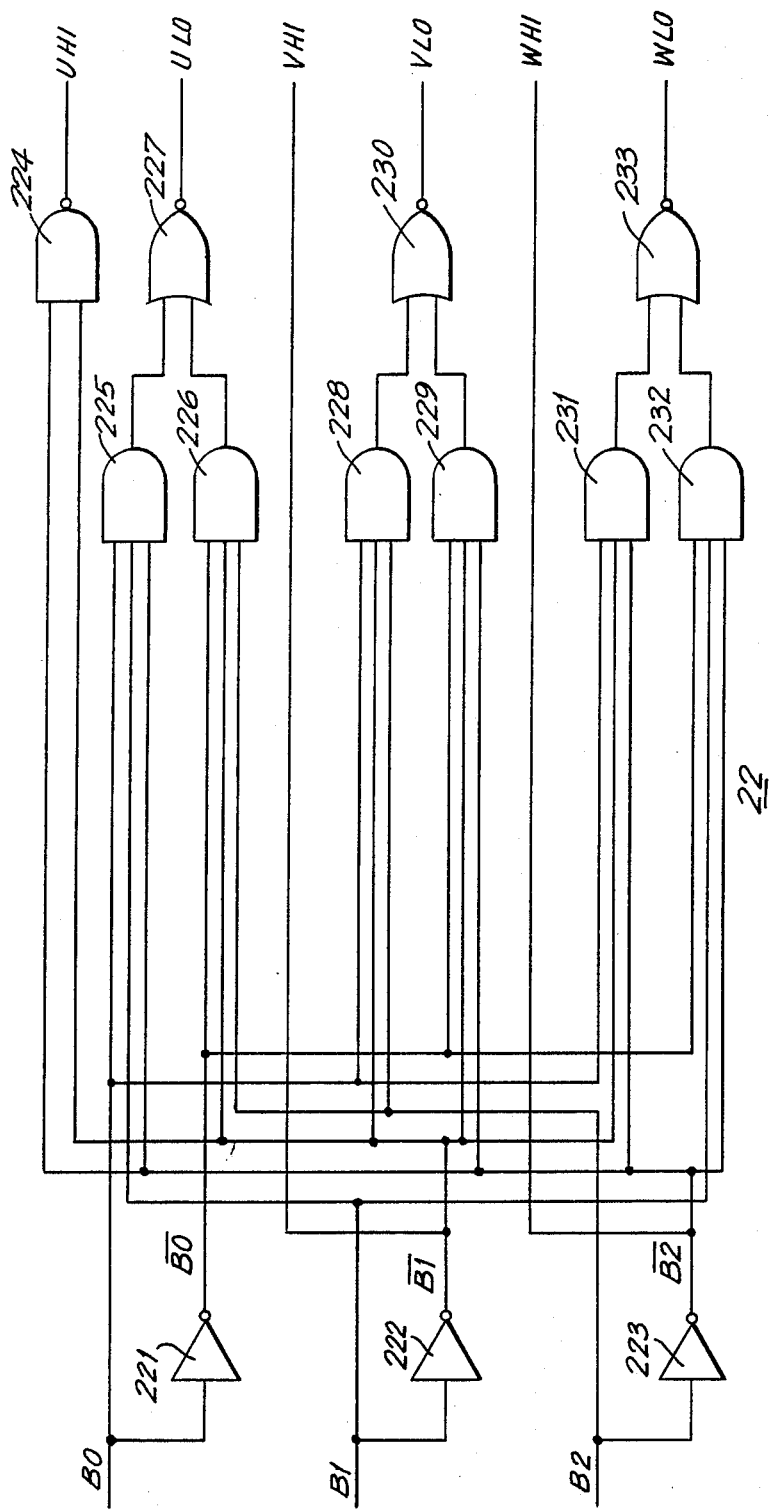
FIG. 3 is a logic diagram of a portion of the motor drive circuitry.

A logic diagram of decoder 22 is illustrated in FIG. 3. One of ordinary skill in the art will appreciate how the respective signals B0, B1 and B2 provided by counter 20 are decoded to produce the Uhi, Vhi, Whi, Ulo, Vlo and Wlo phase energizing signals respectively. Hence, in the interest of brevity, further description of decoder 22 is not provided.

Driver 24 is illustrated in significantly simplified form and is adapted to supply current through two of the motor phases in response to the phase energizing signals produced by decoder 22. A first set of transistor switches 241, 243 and 245 is coupled between phases U, V and W, respectively, and a power supply +E for supplying a drive current to a respective phase when the transistor switch is turned ON. As shown, the collector-emitter circuit of transistor 241 is connected in series with phase U, the collector-emitter circuit of transistor 242 is connected in series with phase V, and the collector-emitter circuit of transistor 245 is connected in series with phase W. These transistor switches thus may be referred to as Uhi, Vhi and Whi switches, respectively.

These transistor switches may be formed as PNP transistor devices having base electrodes connected to the Uhi, Vhi and Whi outputs, respectively, of decoder 22.

A second set of transistor switches 242, 244 and 246 is connected between phases U, V and W, respectively, and a reference level, such as ground. Transistor switches 242, 244 and 246 function as variable resistors whose resistance values are determined by the combination of the energizing signals supplied thereto from decoder 22 in combination with a bias current supplied by current control comparator 28.

As an example, transistor switches 242, 244 and 246 may be formed as FET switching devices 1RFD123. When one of these transistor switches is turned ON, current flows from the phase connected thereto through the transistor switch to ground. The magnitude of the current which flows through the transistor switch and, thus, which flows through the phase connected thereto may be adjusted by changing the bias current supplied to the base (or gate) thereof.

Current sense amplifier 26 is illustrated as an operational amplifier 260 having inverting and non-inverting inputs supplied with a voltage produced across a current sense resistor 261. In one embodiment, current sense resistor 261 is a calibrated 0.75 ohm resistor whose tolerance is ±1%. The voltage produced across resistor 261 is proportional to the current which flows through the energized phases of motor 10, and this voltage is amplified in accordance with the gain (e.g., a gain of 10) of operational amplifier 260. The output of current sense amplifier 26 is coupled to current control comparator 28 which, as illustrated, may be formed as an operational amplifier 280 having an inverting input coupled to the output of operational amplifier 260 and a non-inverting input coupled to an input 112 to receive a current command signal produced by microprocessor 30 as a representation of the desired current in motor 10. In the illustrated embodiment, current control comparator 28 is formed as an integrating amplifier which produces an error signal that is a function of the difference between the desired motor speed, as represented by the current command signal supplied to input 112, and the actual motor current, as represented by the output of operational amplifier 260 which, in turn, is a function of the current flowing through the motor. A diode 281 couples the error signal as a bias current to each of transistor switches 242, 244 and 246. It is seen that, as the error signal increases in magnitude, transistor switches 242, 244 and 246 are rendered more conductive to increase the current flowing through motor 10. This accelerates the motor. Conversely, if the error signal is reduced in magnitude, transistor switches 242, 244 and 246 are rendered less conductive to reduce the current flowing through the motor, thereby decelerating motor 10.

FIG. 2 also illustrates schematically one embodiment brake circuit 11. The brake circuit is comprised of a transistor 117 whose collector-emitter circuit is coupled to the base (or gate) electrodes of all of transistor switches 242, 244 and 246. A capacitor 118 is connected across the base-emitter electrode of transistor 117 and is coupled via a relatively high resistance resistor 125 to power supply +E. The emitter electrode of transistor 117 is coupled to a capacitor 115, via resistor 119 and this capacitor also is coupled to the power supply by means of a diode 116 and the resistor 119.

Although forming no part of the present invention per se, it will be seen that, when motor 10 and the illustrated motor drive circuit undergoes normal operation, capacitors 115 and 118 are charged from power supply +E to maintain transistor 117 nonconductive. However, if power is interrupted, capacitor 118 discharges at a relatively slow rate through resistor 125. If the illustrated apparatus is used in a disk drive, the purpose of the slow discharge is to permit continued rotation of motor 10, even after power has been interrupted, to produce a back emf which is used by actuator circuitry (not shown) to move the usual heads included in the disk drive to a park position. After capacitor 118 is sufficiently discharged, transistor 117 is turned ON to couple the voltage stored across charged capacitor 115 to the base (or gate) electrodes of transistors 242, 244 and 246. As a result, all of these transistors are turned on concurrently to provide a low impedance shunt to stator phases U, V and W. Hence, the motor windings are short-circuited to dynamically brake the motor to a stop.

The manner in which the circuitry schematically illustrated in FIG. 2 operates to control the operation of motor 10 now will be described in conjunction with the waveforms shown in FIGS. 4A-4N. Let it be assumed, initially, that motor 10 is operating at its designed speed. As a numerical example, the motor rotates at 3600 RPM or 60 revolutions per second. Let it be further assumed that, for a given state of decoder 22, current flows through phases U and V such that the voltage at terminal 101' is approximately +E and terminal 102' is at essentially ground potential. In the absence of a back emf component, the average DC voltage at center tap 104 thus is +E/2. However, only terminals 101' and 102' are maintained at fixed voltage levels because decoder 22 is assumed to turn ON transistors 241 and 244. The actual voltage at center tap 104 may vary. In fact, the variable component of the voltage at center tap 104 is comprised predominantly of the harmonic components of the back emf.

It is appreciated that terminals 121' and 122' of the illustrated resistor network likewise are supplied with voltages equal to +E and ground, respectively. Here too, the average DC voltage level at center tap 124 is equal to +E/2. Since a back emf component is not generated in the resistor network, the difference between the voltages at center taps 104 and 124 is the difference between the composite of the back emf component and +E/2, provided at center tap 104, and simply +E/2 (the simulated signal), provided at center tap 124. Operational amplifier 140 produces a difference signal as a function of the difference between the composite and simulated signals, which is seen to be equal to the harmonic components. FIG. 4A is a waveform diagram of the third harmonic component (the prevalent harmonic component) from which commutation noise due to the switching of transistors 241-246 and the di/dt component have been filtered.

FIG. 4A also indicates the relationship between the third harmonic component, the fundamental back emf component, and the mechanical rotation of the motor. One complete revolution of the motor encompasses four electrical cycles of the fundamental which, of course, encompasses twelve cycles of the third harmonic component. A quarter revolution thus is equal to one complete electrical cycle, or three cycles of the third harmonic component.

Comparator 162 compares the third harmonic waveform (FIG. 4A) with a reference level to produce the rectangular waveform illustrated in FIG. 4B. Comparator 162 exhibits hysteresis, and therefore a phase shift is produced between the rectangular waveform produced by the comparator relative to the zero crossings of the third harmonic 7 component. FIG. 4B illustrates a 1° phase shift due to hysteresis which may be on the order of about 2% of the peak value of the third harmonic. This hysteresis is present primarily to provide a degree of noise immunity for comparator 162, as will be described.

Edge detector 163 detects the positive-going and negative-going edges of the rectangular waveform (FIG. 4B) to produce the zero crossing pulses shown in FIG. 4C. These pulses are supplied through AND gate 182 and OR gate 183 to the clock input of D-type flip-flop circuit 201. At this time, the microprocessor supplies a binary "1" to input 111 so as to inhibit AND gates 181 and 184 and enable AND gates 182 and 185.

Comparator 171 preferably exhibits a hysteresis characteristic much greater than that of comparator 162, such as on the order of about 40% of the peak value of the third harmonic component. As a result, the comparator generates the rectangular waveform shown in FIG. 4D in response to the crossing by the third harmonic component of reference levels substantially above and below the zero level. It is appreciated that the rectangular output produced by comparator 171 is phase-shifted with respect to the rectangular output produced by comparator 162. As a numerical example, this phase shift is on the order of about 30°. The phase-shifted rectangular output from comparator 171 is supplied through AND gate 185 and OR gate 186 to the D input of flip-flop 201.

The phase shift in the rectangular outputs from comparators 162 and 171 provides noise immunity, as is now described. Noise, such as commutation noise, superimposed on the third harmonic component (FIG. 4A) and not removed by filters 141 and 142 results in a small number of pulses that appear at the leading and trailing edges of the waveforms shown in FIGS. 4B and 4D. However, these pulses present in the waveform of FIG. 4B end prior to the transitions of the rectangular waveform of FIG. 4D. Hence, even if a small number of pulses pass through AND gate 182 to the clock input of flip-flop circuit 201, the fact that a constant DC level is supplied at that time by AND gate 185 to the D input of this flip-flop means that only one change of state of this flip-flop circuit will occur. Thus, the "noise" present at the leading and trailing edges of the waveforms shown in FIGS. 4B and 4D do not affect the triggering of flip-flop circuit 201. The hysteresis exhibited by comparators 162 and 171 immunizes the flip-flop circuit to such noise and avoids false triggering.

Flip-flop circuit 201 is triggered to the state determined by the voltage level of the rectangular output from comparator 171 in response to each zero crossing pulse supplied to the clock input thereof. Accordingly, the state of flip-flop 201 appears as shown in FIG. 4E. It is appreciated that the Q output of this flip-flop circuit constitutes the clock pulse for flip-flop circuits 202 and 203 and also constitutes the B0 input of decoder 22.

FIG. 4E illustrates a cycle of 6 states commencing arbitrarily at state 0 and ending at state 5. These 6 states are repeated cyclically. Let it be assumed, at the beginning of state 0, that flip-flop circuit 203 is reset such that its $\overline{Q_0}$ output is changed over from a binary "0" to a binary "1". At the next negative transition of the signal B0, that is, at the end of state 1, flip-flop circuit 202 is set, as shown in FIG. 4F. However, prior to being set, flip-flop circuit 202 was in its reset state, thereby applying a binary "1" to the K input of flip-flop circuit 203. Hence, although flip-flop circuit 202 is changed over to its set state at the end of state 1, flip-flop circuit 203 remains in its reset state.

Since flip-flop circuits 202 and 203 are triggered in response to negative transitions supplied to the clock inputs thereof, no change in the state is effected at the end of state 2. However, at the end of state 3, a binary "1" is supplied to both of the J and K inputs of flip-flop circuit 202 and, thus, the state of this flip-flop circuit is changed. Since the flip-flop had exhibited its set state during state 3, flip-flop 202 now is reset, as shown in FIG. 4F. But, prior to being reset, flip-flop circuit 202 supplied a binary "1" to the J input of flip-flop circuit 203. Thus, at the end of state 3, flip-flop circuit 203 is set, as shown in FIG. 4G.

The respective states of the flip-flop circuits 202 and 203 remain without change at state 4, and at state 5, the binary "1" supplied to the K input of flip-flop circuit 203 serves to reset this flip-flop. Thus, at the end of state 5, the flip-flop circuits are in the same respective states as at the beginning of state 0, and the foregoing cycle is repeated. Hence, the B0, B1 and B2 signals produced by flip-flop circuits 201, 202 and 203, respectively, are as illustrated in FIGS. 4E-4G.

As signals B0-B2 change, decoder 22 (shown schematically in FIG. 3) responds to these changing signals to produce the phase energizing signals Uhi, Ulo, Vhi, Vlo, Whi and Wlo as shown in FIGS. 4H-4M, respectively. A pair of stator phases is energized when a "hi" signal and a "lo" signal both are at the binary "0" level. Thus, at state 0, the Uhi and Vlo phase energizing signals both are a binary "0", and phases U and V are energized. At state 1, the Uhi and Wlo phase energizing signals are both a binary "0" and the Vhi and Wlo signals both are at binary "0", and phases V and W are selected for energization. At state 3, the Vhi and Ulo signals both are a binary "0" and phases V and U are selected for energization. At state 4, the Whi and Ulo signals both are a binary "0" and phases W and U are selected for energization. Finally, at state 5, the Whi and Vlo signals both are a binary "0" and phases W and V are selected for energization. FIG. 4N illustrates the sequence in which the indicated phases are selected for energization, and it is seen that this sequence repeats every 6 states.

At state 0, for example, the Uhi phase energizing signal turns transistor switch 241 ON to permit current to flow from power supply +E through this transistor and through phase U. Also at state 0, phase energizing signal Vlo is a binary "0" to turn transistor switch 244 ON. Thus, phase V is connected to ground via transistor switch 244. As a result, current flows from power supply +E through transistor 241, through phase U, through phase V, and through transistor switch 244 to ground. A similar operation is carried out to supply drive current through the remaining phases as those phases are selected for energization by decoder 22.

The current which flows through the energized phases also flows through sense resistor 261. As a result, a voltage is produced across this sense resistor and amplified by operational amplifier 260. This current and, thus, the voltage produced by the operational amplifier, is a measure of the actual current in the motor 10. Operational amplifier 280 compares this measured current to a desired current represented by a command signal applied to input 112 by microprocessor 30. If the actual motor current differs from the desired current, the resultant error signal produced by operational amplifier 280 is supplied by diode 281 to the base (or gate) electrodes of transistor switches 242, 244 and 246 to adjust the conductivity of each of these transistor switches when energized. It is recognized that, as the conductivity of these transistor switches varies, current flow therethrough likewise varies which, in turn, varies the speed of motor 10. Hence, current sense resistor 261, operational amplifier 260, operational amplifier 280 and the bias currents supplied to transistor switches 242, 244 and 246 function as a feedback circuit to minimize differences between actual and desired motor current. Thus, motor 10 is controlled to rotate at its operating speed by the proper energization of the phases thereof, without use of external rotary position detectors, such as Hall elements, optical sensors, or the like.

Comparator 171 also functions as a polarity detector such that the proper polarity of the third harmonic component is supplied to the D input of flip-flop circuit 201 for proper phase energization of the motor phases. As is apparent, the D input of this flip-flop circuit may be supplied with a positive or negative DC signal, or polarity, from comparator 171. It has been found that if the opposite polarity is supplied, for example, if the negative half cycle of the third harmonic is gated to the flip-flop circuit at a time that the positive half cycle should be gated, the resultant count of counter 20 is such that, when decoded, produces erratic motor speed. This, in turn, distorts the third harmonic component in the back emf; and comparator 140 fails to detect it. Consequently, decoder 22 is driven at a rate which causes motor 10 to slip; and this slippage continues until the phase energization state of decoder 22 corresponds to the polarity of the half cycle then gated to flip-flop circuit 201. Thus, proper polarity is restored and motor 10 thereafter is driven at its proper speed.

The start-up operation carried out by the circuitry schematically illustrated in FIG. 2 has been described above in conjunction with the start-up operation carried out by the circuitry shown in block diagram form in FIG. 1. It is appreciated that, during this start-up operation, microprocessor 30 applies a binary "0" to input 111, thereby inhibiting AND gates 182 and 185 while enabling AND gates 181 and 184. The microprocessor also supplies clock pulses at a relatively low frequency, such as on the order of about 25 Hz for one example, to input 110. These clock pulses are gated to the clock input of flip-flop circuit 201 by AND gates 181 and 183. The Q output of flip-flop circuit 201 is fed back to the D input thereof via AND gate 184 and OR gate 186. Because of this feedback arrangement, the state of the flip-flop changes in response to each clock pulse supplied thereto. This change of state of flip-flop circuit 201 is similar to that shown in FIG. 4E. Of course, the repetition rate of the waveform shown in FIG. 4E is determined by the clock pulses supplied to input 110 by microprocessor 30.

As flip-flop circuit 201 toggles, flip-flop circuits 202 and 203 undergo the same state changes as shown in FIGS. 4F and 4G. Hence, decoder 22 generates the phase energizing signals Uhi, Ulo, Vhi, Vlo, Whi, and Wlo shown in FIGS. 4H-4M as discussed above. Here too, it is appreciated that although the phase energizing waveforms produced during the start-up operation resemble those produced during normal motor operation, the repetition rate is much less.

As before, the phase energizing signals select pairs of transistor switches to be turned ON, thereby enabling drive current to be supplied to pairs of phase windings. The particular phase windings which are energized vary as the phase energizing signals are produced.

Figure 5:
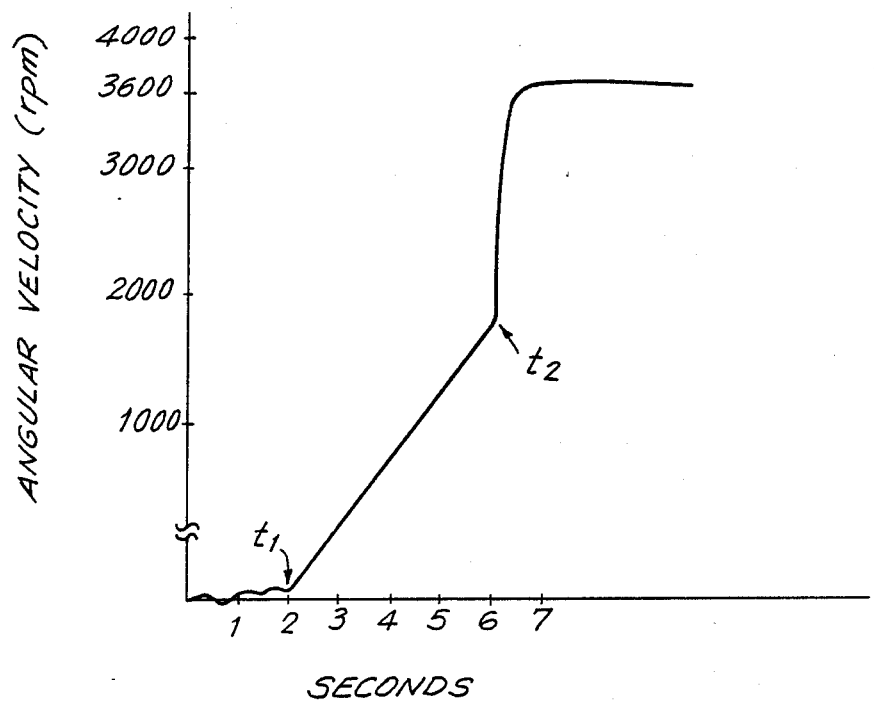
FIG. 5 is a graphical representation of the start-up operation of the present invention.

As shown in FIG. 5, and as discussed above, during the initial portion of the start-up operation, the drive current supplied to the energized phases of motor 10 is ramped up. This may be achieved by increasing the command signal supplied to input 112 by microprocessor 30. As this command signal increases, the bias current applied to the base (or gate) electrodes of transistor switches 242, 244 and 246 increases to increase the conductivity thereof. It is recalled that, as the conductivity of these transistor switches increases, the current level conducted through the energized phase windings likewise increases. Hence, the drive current supplied to motor 10 is gradually increased in a ramp-like manner over a period of time which may extend from 1 to 2 seconds.

After the drive current has been ramped up to its operating level, no further changes are made thereto and no change is made in the clock pulse frequency until time $t_1$. This delay, which may be on the order of the time for the motor to make one revolution, enables modulations in the velocity of motor 10 to damp. At time $t_1$, which may be, for example, approximately two seconds, the clock pulse frequency generated by microprocessor 30 is increased gradually in a ramp-like manner from its initial relatively low frequency to a much higher frequency. As the frequency of the clock pulses increases, for example, as this frequency increases to about 750 Hz, the repetition rate at which the phase energizing signals (FIGS. 4H-4M) are produced likewise increases. As a result, the velocity of motor 10 is increased.

When the higher clock pulse frequency is reached at time $t_2$, motor 10 will be operating at approximately 1800 RPM. More specifically, since the motor rotates by 24 steps to complete one revolution, the actual motor speed is calculated to be 750 Hz÷24 steps/rev.×60 sec./min. or 1875 RPM. In one embodiment, time $t_2$ is reached approximately 6 seconds after initiation of the start-up operation.

After the microprocessor has increased the clock frequency to 750 Hz, the microprocessor changes over the operation of the illustrated circuit such that the third harmonic component which now is detected and used to produce position-representing signals, is supplied to the clock input of flip-flop circuit 201. That is, at time $t_2$, a binary "1" is applied to input 111 to inhibit AND gates 181 and 184 while enabling AND gates 182 and 185. At that time, the operation described previously with respect to FIGS. 4A-4N is carried out. The motor then accelerates quickly from approximately 1800 RPM to its operating speed of 3600 RPM. In one example, this acceleration occurs in less than 0.5 seconds.

While the present invention has been particularly shown and described with reference to a preferred embodiment, it will be readily appreciated by those of ordinary skill in the art that various changes and modifications may be made without departing from the spirit and scope of the present invention. For example, the numerical examples described above, and particularly those illustrative of the speed of motor 10, the frequencies of the clock pulses generated by the microprocessor during a start-up operation, and the time durations of the respective sub-operations included in the start-up operation merely are illustrative and are not intended to limit the present invention solely to the described examples. Likewise, the number of magnetic poles included in the brushless motor need not be limited to eight. A lesser, or even greater, number of poles may be used in motor 10 if desired. Also, the harmonic component which is detected to provide an indication of motor position need not be limited solely to the third harmonic, although the third harmonic component clearly is preferable. Likewise, the signals which are used to generate the phase energizing signals need not be derived solely from the zero crossing levels of the detected harmonic component. Any other desirable reference crossing level may be employed.

It is intended that the appended claims be interpreted as including the specific embodiment described herein, equivalents thereto, and the various modifications referred to above.

What is claimed is:

1. Apparatus for driving an n-phase, m-pole (n and m are integers) brushless motor without use of physical rotary position detectors, such as Hall elements, comprising: harmonic detecting means for detecting an harmonic component of back emf induced in the phases of said motor; first and second comparator means exhibiting first and second different hysteresis characteristics, respectively, for generating first and second rectangular waveforms when said harmonic component crosses a reference level; counting means including an input stage whose state is determined by the polarity of one of said rectangular waveforms at a time determined by transitions in the other of said rectangular waveforms; decoding means for decoding the count of said counting means to produce a sequence of phase energizing signals to energize selected phases of said motor; and drive current means for supplying drive current to those phases energized by said phase energizing signals.

2. The apparatus of claim 1 wherein said input stage comprises flip-flop means having a data input for receiving said one rectangular waveform and a clock input;

3. Apparatus for driving an n-phase, m-pole (n and m are integers) brushless motor without use of physical rotary position detectors, such as Hall elements, comprising:
    harmonic detecting means for detecting an harmonic component of back emf induced in the phases of said motor;
    phase energizing means responsive to said harmonic component for generating phase energizing signals to energize selected phases of said motor;
    drive current means for supplying drive current to those phases energized by said phase energizing signals; and
    start-up means coupled to said phase energizing means for controlling the phase energizing signals generated to start up the rotation of said motor, said start-up means including means for supplying a clock signal at a relatively low frequency to said phase energizing means for a first predetermined time period, means for increasing the frequency of said clock signal for a second predetermined time period, and means for terminating the clock signal supplied to said phase energizing means at the completion of said second predetermined time period.

4. The apparatus of claim 3 wherein said start-up means further includes means for controlling said drive current means to supply a drive current whose amplitude gradually increases over said first predetermined time period in a ramp-like manner from a relatively low reference level to a motor drive level.

5. The apparatus of claim 4 wherein said start-up means further includes means for delaying the beginning of said second predetermined time period relative to the completion of said first predetermined time period.

* * * * *

UNITED STATES PATENT AND TRADEMARK OFFICE
CERTIFICATE OF CORRECTION

PATENT NO. : 4,922,169
DATED : May 1, 1990
INVENTOR(S) : John J. Freeman

It is certified that error appears in the above-identified patent and that said Letters Patent is hereby corrected as shown below:

Claim 2, line 4, column 24, line 7, after "input;" insert --and further comprising edge detecting means for receiving the other rectangular waveform to produce a clock pulse in response to a transition in said other rectangular waveform--.

Signed and Sealed this

Sixth Day of August, 1991

Attest:

HARRY F. MANBECK, JR.

*Attesting Officer*     *Commissioner of Patents and Trademarks*